US008837382B2

(12) United States Patent
Rangan

(10) Patent No.: US 8,837,382 B2
(45) Date of Patent: Sep. 16, 2014

(54) MULTIMEDIA BROADCAST AND MULTICAST SERVICE ENHANCEMENTS

(75) Inventor: Mohan Rangan, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 738 days.

(21) Appl. No.: 12/539,259

(22) Filed: Aug. 11, 2009

(65) Prior Publication Data

US 2010/0039978 A1 Feb. 18, 2010

Related U.S. Application Data

(60) Provisional application No. 61/188,691, filed on Aug. 11, 2008.

(51) Int. Cl.
| | | |
|---|---|---|
| *H04W 4/00* | (2009.01) | |
| *H04L 12/28* | (2006.01) | |
| *H04H 20/71* | (2008.01) | |
| *H04L 12/18* | (2006.01) | |
| *H04W 88/00* | (2009.01) | |
| *H04W 80/04* | (2009.01) | |
| *H04W 76/00* | (2009.01) | |
| *H04W 92/24* | (2009.01) | |

(52) U.S. Cl.
CPC ........... *H04L 12/189* (2013.01); *H04W 88/005* (2013.01); *H04W 80/04* (2013.01); *H04W 76/002* (2013.01); *H04W 92/24* (2013.01)
USPC ............................. 370/329; 370/312; 370/390

(58) Field of Classification Search
USPC .......................................... 370/312, 338, 390
See application file for complete search history.

(56) References Cited

U.S. PATENT DOCUMENTS

| | | | |
|---|---|---|---|
| 5,517,494 A | 5/1996 | Green | |
| 6,331,983 B1 * | 12/2001 | Haggerty et al. | 370/400 |
| 7,107,066 B2 * | 9/2006 | Toth et al. | 455/458 |
| 2005/0043035 A1 | 2/2005 | Diesen et al. | |
| 2007/0286137 A1 | 12/2007 | Narasimhan et al. | |
| 2008/0130637 A1 * | 6/2008 | Kant et al. | 370/389 |

OTHER PUBLICATIONS

International Search Report for corresponding International Patent Application No. PCT/US2009/053408.
Albanna et al., "IANA Guidelines for IPv4 Multicast Address Assignments," tools.ietf.org, Aug. 2001, pp. 1-8.
Mobile Broadcast/Multicast Service (MBMS) White Paper, MediaLab, Telia Sonera Finland, Aug. 2004, pp. 1-12.
3rd Generation Partnership Project; Technical Specification Group Services and System Aspects; Multimedia Broadcast/Multicast Service (MBMS); Architecture and functional description (Release 8) (3GPP TS 23.246 v8.2.0), Technical Specification, 3GPP, Jun. 2008, pp. 1-57.

(Continued)

*Primary Examiner* — Afshawn Towfighi
(74) *Attorney, Agent, or Firm* — Wilmer Cutler Pickering Hale and Dorr LLP

(57) ABSTRACT

Systems and methods for enhancing broadcast/multicast services in telecommunication networks are disclosed. A multicast router is provided between a network node, such as an SGSN or GGSN, and a radio access network. A multicast transport address can be provided to send packet data from network devices to the radio network in a multicast fashion. The multicast transport address works with multicast equipment, such as multicast routers, to reduce the burdens of sending data in a broadcast or multicast fashion to mobile nodes.

21 Claims, 6 Drawing Sheets

(56) References Cited

OTHER PUBLICATIONS

3rd Generation Partnership Project; Technical Specification Group Services and System Aspects; Multimedia Broadcast/Multicast Service; Stage 1 (Release 8) (3GPP TS 22.46 v8.4.0), 3GPP, Jun. 2008, pp. 1-18.

3rd Generation Partnership Project; Technical Specification Group Radio Access Network; Introduction of Multimedia Broadcast Multicast Service (MBMS) in the Radio Access Network (RAN); Stage 2 (Release 8) (3GPP TS 25.246 v8.3.0), 3GPP, Mar. 2009; pp. 1-71.

* cited by examiner

MULTIMEDIA BROADCAST AND MULTICAST SERVICE ENHANCEMENTS

CROSS REFERENCE TO RELATED APPLICATION

This application claims priority under 35 U.S.C. Section 119(e) to Provisional Application Ser. No. 61/188,691, filed Aug. 11, 2008, which is incorporated by reference.

TECHNICAL FIELD

This disclosure relates to broadcast and multicast service enhancements in telecommunication networks are disclosed.

BACKGROUND

Broadcast/multicast service is used to communicate the same information to a number of end devices. Traditionally broadcasting has been used to distribute radio and television channels to an audience. Broadcasting allows stations to transmit information to a large number of end devices efficiently. Wireless packet data networks used by mobile nodes, such as cell phones or personal digital assistants (PDA), typically send information directly addressed to a particular device (i.e., unicast). The typical wireless architecture requires processing to set up and maintain connections through to the end devices, which can be burdensome in terms of processing. Depending on the number of radio network controllers that are connected on the network, the data replication necessary for broadcast/multicast service can quickly become unsustainable depending on the network architecture.

As is generally know, "broadcast" tends to refer to point-to-multipoint communication where all people within a broadcast area receive the broadcast signals; "multipoint" generally refers to point-to-multipoint communication where specified users, such as subscribers, receive the multicasted signals. Unless the context indicates specifically otherwise, the term "multicast" will refer to multicast and broadcast, as broadcast is essentially a specific case of multicast.

SUMMARY

Systems and methods for enhancing broadcast/multicast services in telecommunication networks are disclosed. A multicast router is provided between a network node, such as an SGSN or GGSN, and a radio access network. A multicast transport address can be provided to send packet data from network devices to the radio network in a multicast fashion. The multicast transport address works with multicast equipment, such as multicast routers, to reduce the burdens of sending data in a broadcast or multicast fashion to mobile nodes. Signaling between network devices can be modified to accommodate the multicast transport address. A multicast transport address provides greater scalability and can reduce processing power needed for data replication that would otherwise be needed in a standard multimedia broadcast/multicast service.

Other features and advantages will become apparent from the following description, drawings, and claims.

DESCRIPTION

Figure 1:
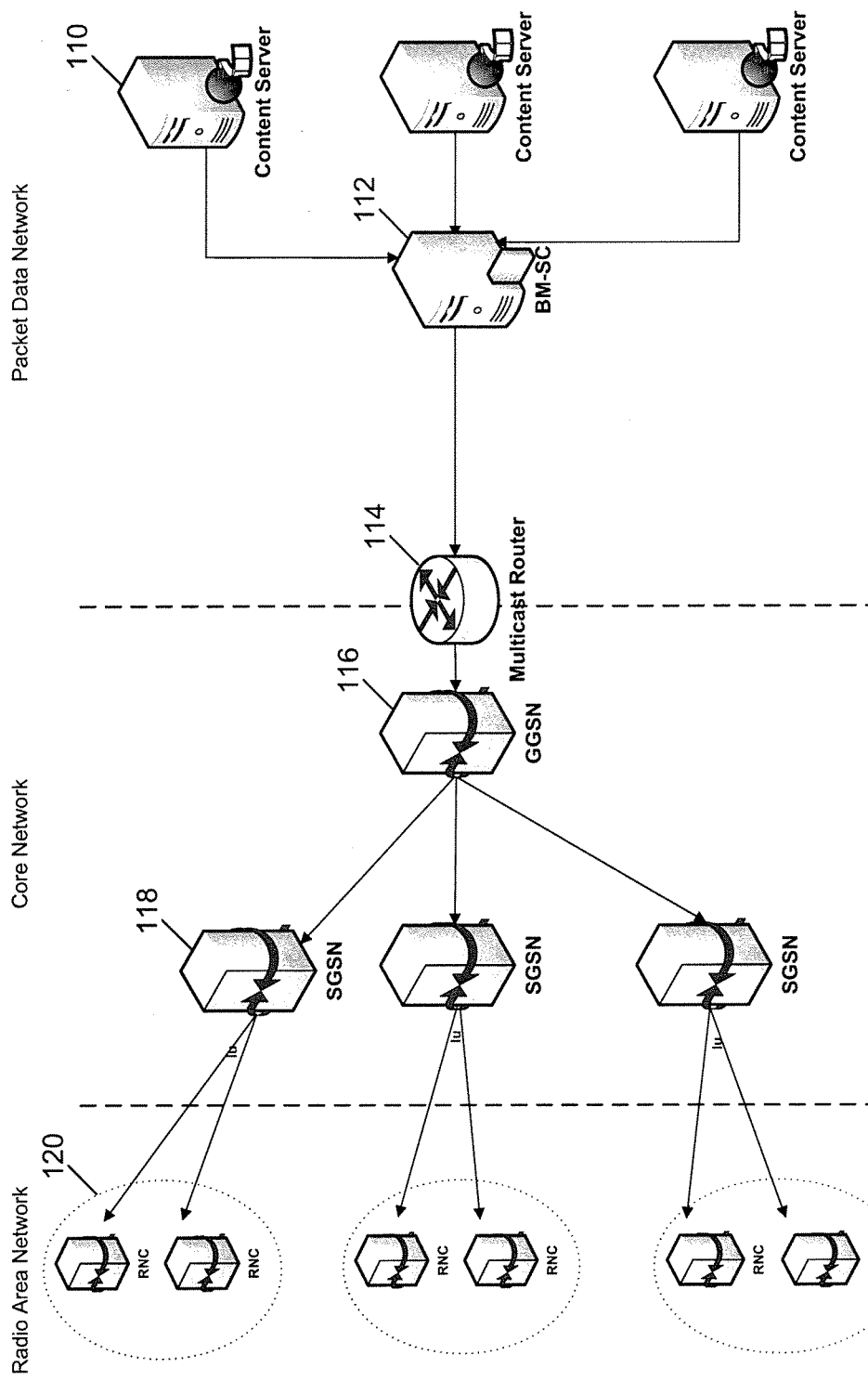
FIG. 1 illustrates a standard multimedia broadcast/multicast service delivery scheme.

FIG. 1 illustrates an example of a known multimedia broadcast/multicast service (MBMS) network. The network includes content servers 110, broadcast multicast service center (BM-SC) 112, a multicast router 114, a Gateway General packet radio service Support Node (GGSN) 116, a Serving General packet radio service Support Node (SGSN) 118, and radio network controllers (RNC) 120. The radio network controllers manage the radio access network which supplies a radio link to mobile nodes (not shown), such as cell phones, PDAs, etc. Other equipment can be used to supply and control the radio link to a mobile node.

Content streams sent from a content server 110 can include data such as video, music, or other information. The content streams are sent to BM-SC 112, which forwards the content stream to the GGSN 116 as a multicast stream. The GGSN 116 makes a copy of the multicast stream and tunnels the content stream to each SGSN 118 that has registered for that bearer to receive the content stream. Each SGSN 118 makes a copy of the content stream and tunnels the content stream to each RNC/base station subsystem (BSS), which has registered mobile nodes (not shown) for that content stream. This tunneling and copying of the data stream can become burdensome as the number of connections grows.

With the advent of enhanced High Speed Packet Access (eHSPA) the number of radio equipment nodes serviced by each SGSN could increase. These nodes include RNCs, UMTS/3G eNodeBs, and BSSs. This increase could can lead to burdensome processing demands on the SGSN. For universal mobile telecommunication system (UMTS) networks, a direct tunnel implementation can be used.

Figure 2:
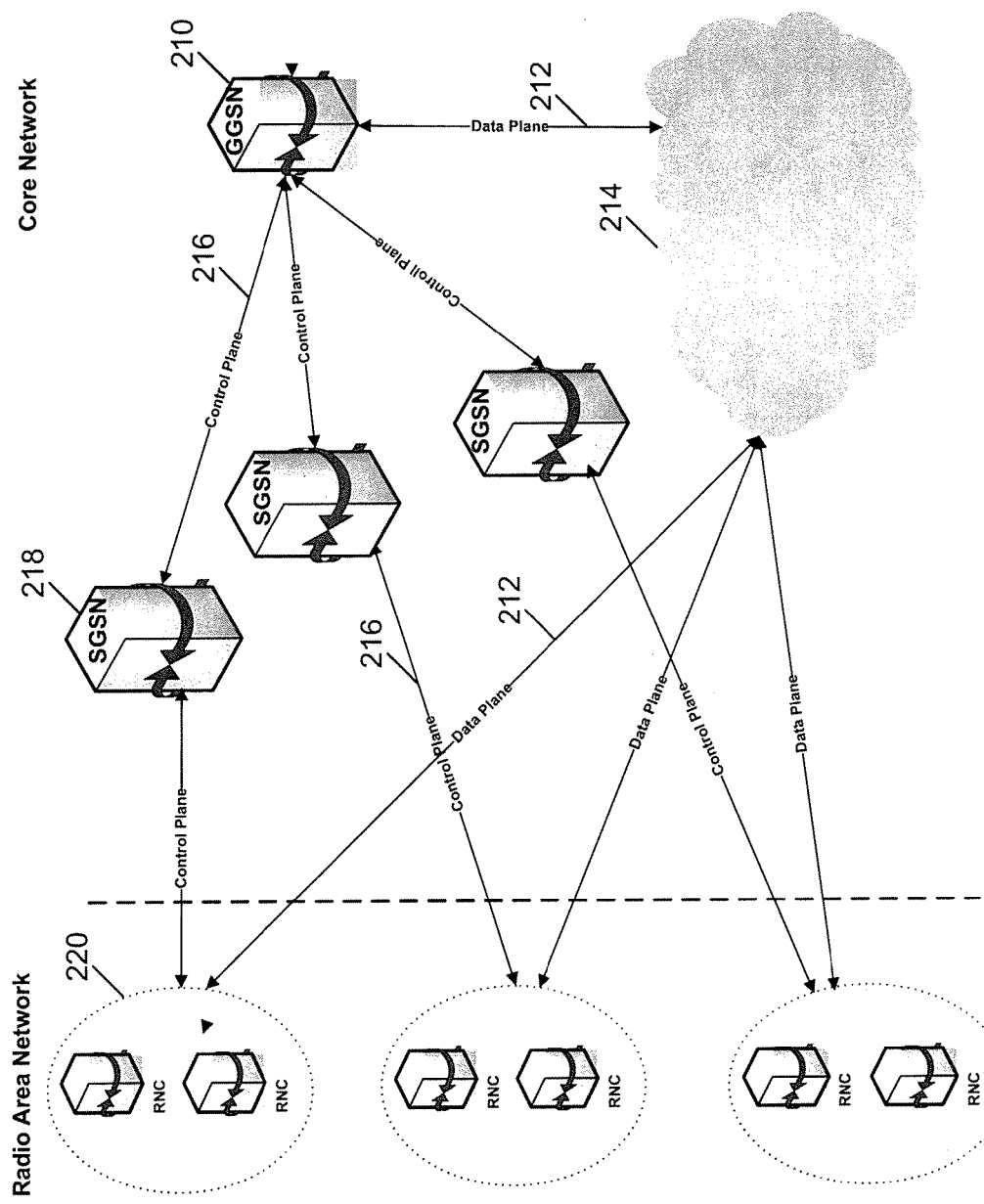
FIG. 2 illustrates a direct connection of the data plane with the radio network controllers in accordance with some embodiments.

FIG. 2 illustrates a direct tunnel scheme introduced in UMTS networks. The network of FIG. 2 includes a GGSN 210, a data plane 212, a network 214, a SGSN 218, and radio area networks (RAN) 220. The data plane 212 runs directly between the RANs 220 and the GGSN 210. This configuration creates a large interconnectivity requirement between the GGSN 210 and the RANs 220. Further, MBMS uses the SGSN in the data plane and calls for efficient usage of the minimal data plane resources between the SGSN and the RNCs.

In embodiments described below, an IP multicast capable access network can be deployed between various points of the network, such as between the SGSN and the radio access networks. This multicast access network reduces or eliminates the need to replicate packets for a bearer stream by core network nodes. As part of this implementation, an IP multicast address is used as a transport address for a GPRS Tunneling Protocol for User Plane (GTP-U) tunnel. GTP-U is an IP based protocol used within GSM and UMTS networks and can be used with UDP or TCP transmission protocols for carrying user data with the GPRS core network and between the RAN and the core network. The user data can be packets in any of IPv4, IPv6, or point-to-point protocol (PPP) formats. The GTP-U tunnel permits many tunnels between each set of end points. When used in UMTS, each subscriber can have one or more tunnels with one tunnel for each packet data protocol (PDP) context that is active, plus tunnels for specific connections with different Quality of Service (QoS) requirements.

The SGSNs can be used to allocate the multicast transport addresses. These addresses are passed to the radio network controllers (RNCs) in the RAN to listen for MBMS messages. SGSN-allotted multicast transport addresses allow usage of two tunnels or a direct tunnel according to the capabilities of the peer nodes, and unicast transport can be used, for example, when the same bearer stream has to be delivered to a GERAN as well as to a UTRAN. QoS treatment in the access network can be tailored according to the capabilities of the connectivity availability to the various location areas of the RAN. Interconnectivity issues between GGSNs and SGSNs belonging to different public land mobile network (PLMN) can be avoided by the SGSN choosing to perform unicast between itself and a foreign GGSN. Similarly, direct tunnel connectivity issues can be avoided.

The SGSNs can be configured with the UDP port numbers to use in the transport envelope to allow overlapping multicast transport addresses between the SGSNs. If a port is not configured, a standard GTP-U UDP port can be used. In some embodiments, multicast transport addresses can be passed to the GGSN so that the multicast stream can be sent directly to the RNCs from the GGSN. Communication of the UDP port to peer nodes can be accomplished by an optional field, e.g., an informative element (IE), to the applicable messages to the RNC and GGSN. In certain embodiments where there are a large number of SGSNs, separate multicast transport ranges and UDP port ranges can be provided for the Iu and Gn interfaces of the SGSN.

Where direct multicast connectivity between the GGSN and the RNCs is implemented, the sending of duplicate packets to a RNC because of clashing multicast transport address allocation by the SGSN can be avoided. A flag can be used at the SGSNs to indicate that the bearer multicast address is duplicated for the multicast transport address. This implementation ensures for a given bearer, that the GGSN forwards one copy into the common multicast network shared by the RNCs.

The GPRS Tunneling Protocol control plane (GTP-C) is used within the GPRS core network for signaling between GPRS support nodes (i.e., GGSNs and SGSNs). This protocol allows the SGSN to activate a session on the subscriber's behalf, to deactivate the session, to adjust quality of service parameters, or to update a session for a subscriber involved in a handover. In some embodiments, to provide a multimedia broadcast/multicast (MBMS) service with this protocol, a transport address is provided in the SGSN address/alternative SGSN address IE of the MBMS session start response message. Also an optional IE, the SGSN Port IE, can be added to communicate the transport layer port to use.

Figure 3:
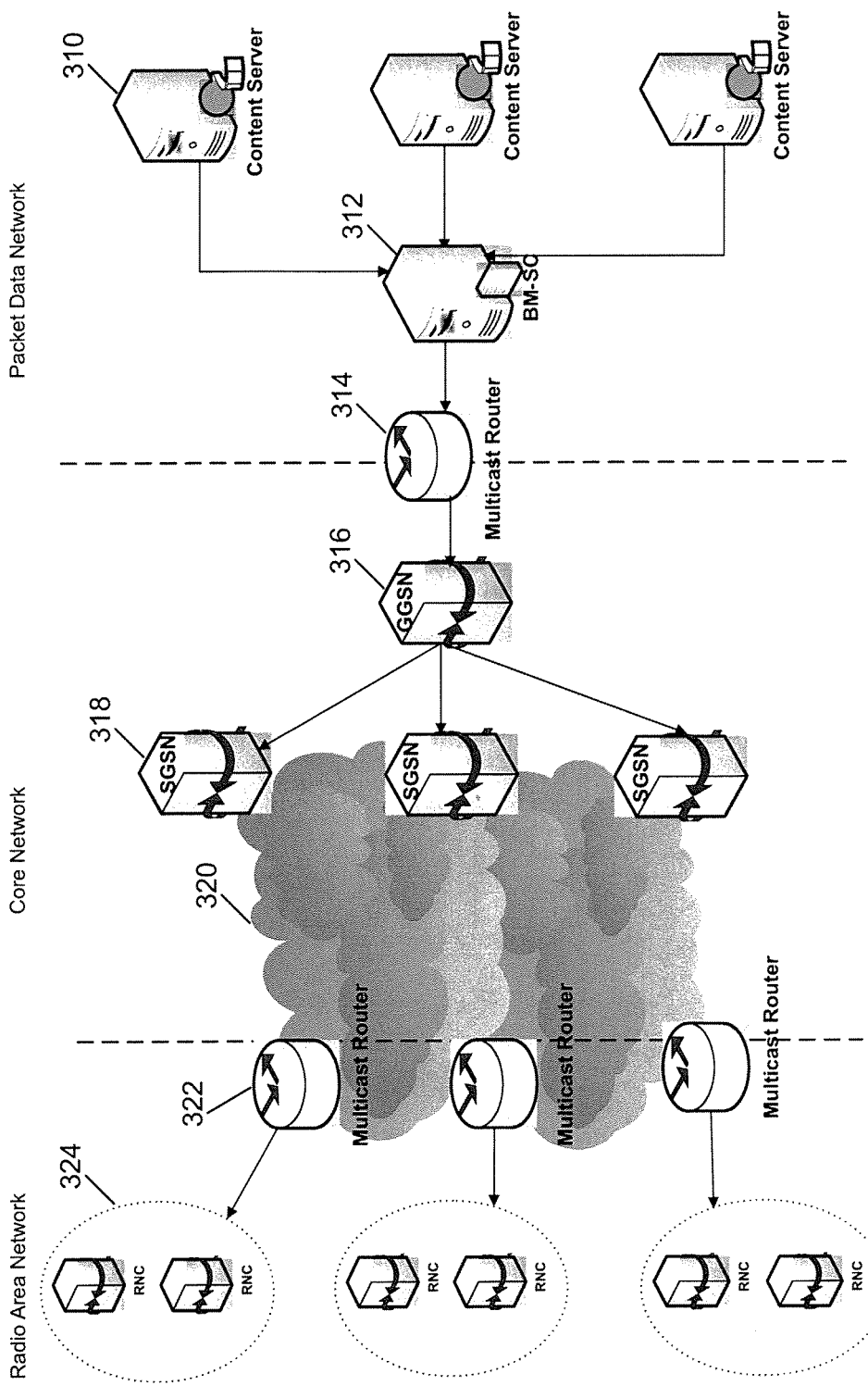
FIG. 3 illustrates multimedia broadcast/multicast service session setup signaling in accordance with some embodiments.

Referring to FIG. 3, a first deployment for a communication network can be a multicast Iu data solution and a unicast Gn GTP-U implementation. The communication network includes content servers 310, broadcast/multicast service center (BM-SC) 312, a multicast router 314, a GGSN 316, SGSNs 318, a multicast network 320, multicast routers 322, and RANs 324 with RNCs. The content server 310 provides data to end users, such as video, pictures, audio, and webpages. The BM-SC provides service and delivery to multimedia broadcast/multicast users. It can serve as an entry point for the content of MBMS transmissions, authorize and initiate MBMS bearer services, and schedule and deliver MBMS transmissions. The BM-SC can also generate charging records to keep track of charges for content provided to users.

The communication network of FIG. 3 provides unicast Gn GPRS Tunneling Protocol for User Plane (GTP-U) and multicast Iu data. The Gn interface between the SGSN and GGSN is used to support the GPRS Tunneling Protocol. The GGSN acts as an interface between the GPRS backbone network and external packet data networks, and can convert packets coming from the SGSN into the appropriate packet data protocol and send them on the corresponding packet data network. The GGSN is responsible for IP address assignment to mobile devices with a wireless communication connection to the network. The SGSN is responsible for the delivery of data packets from and to the user equipment attached to the network through the RANs assigned to the SGSN. The SGSN handles packet routing and transfer and mobility management for the user equipment. The Iu interface from SGSN to the RANs enables interconnection of RNCs in RANs 324 with core network equipment. The communication network of FIG. 3 therefore uses a unicast interface between the GGSN 316 and the SGSN 318, but a multicast interface between SGSN 318 and RAN 324.

SGSN 318 can allot addresses for multicast transport to RANs 324 and provide these addresses to the RNCs in RANs 324. The RNCs can register the allotted address with the Internet Group Multicast Protocol (IGMP)/Multicast Listener Discovery Protocol (MLD). Data traffic is forwarded over unicast GTP tunnels from GGSN to SGSNs. Each SGSN 318 forwards data into multicast network 320. The data can be GTP-U encapsulated to enable the multicast transmission. Multicast semantics in the network can provide the data to the RNCs in RANs 324 for transmission to the user equipment.

Figure 4:
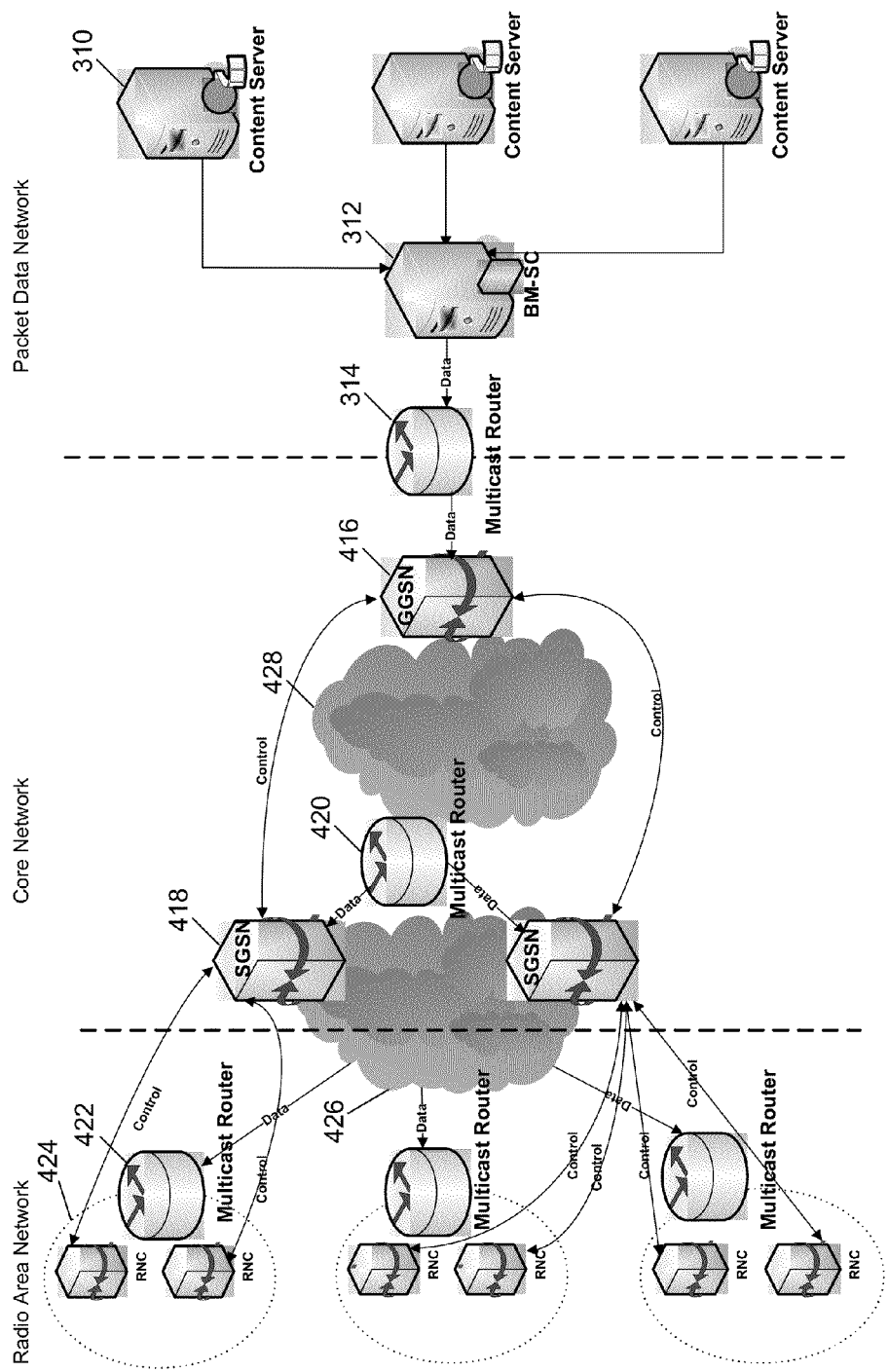
FIG. 4 illustrates multimedia broadcast/multicast service session update signaling in accordance with some embodiments.

Referring to FIG. 4, a second deployment illustrates another multicast architecture for a communication network, including content servers 310, BM-SC 312, multicast router 314, GGSN 416, SGSNs 418, multicast router 420, multicast router 422, radio access network (RAN) 424, edge multicast network 426, and core multicast network 428. This communication network provides multicast data communication between the GGSN 416 and SGSNs 418 in addition to multicast data transmission between SGSN 418 and RAN 424. By using a multicast addressing scheme, the processing requirements for GGSN 416 and SGSN 418 can be reduced.

In some embodiments, the multicast architecture of FIG. 4 is implemented by the SGSN 418 allotting addresses for multicast transport towards the RAN 424 and towards the GGSN 416. The multicast transport addresses can be shared across bearers. The SGSN 418 registers via the internet group multicast protocol/multicast listener discovery protocol (IGMP/MLD) with an upstream multicast router 420. The RNCs of RAN 424 register via IGMP/MLD with an upstream multicast router 422. Multicast GTP-U header encapsulated bearer data is forwarded into the network by GGSN 416. The bearer data is forwarded to specified SGSNs using multicast semantics and each SGSN then forwards multicast GTP-U encapsulated data into an Iu side multicast network. Then bearer data is forwarded to concerned RNCs using multicast semantics.

Figure 5:
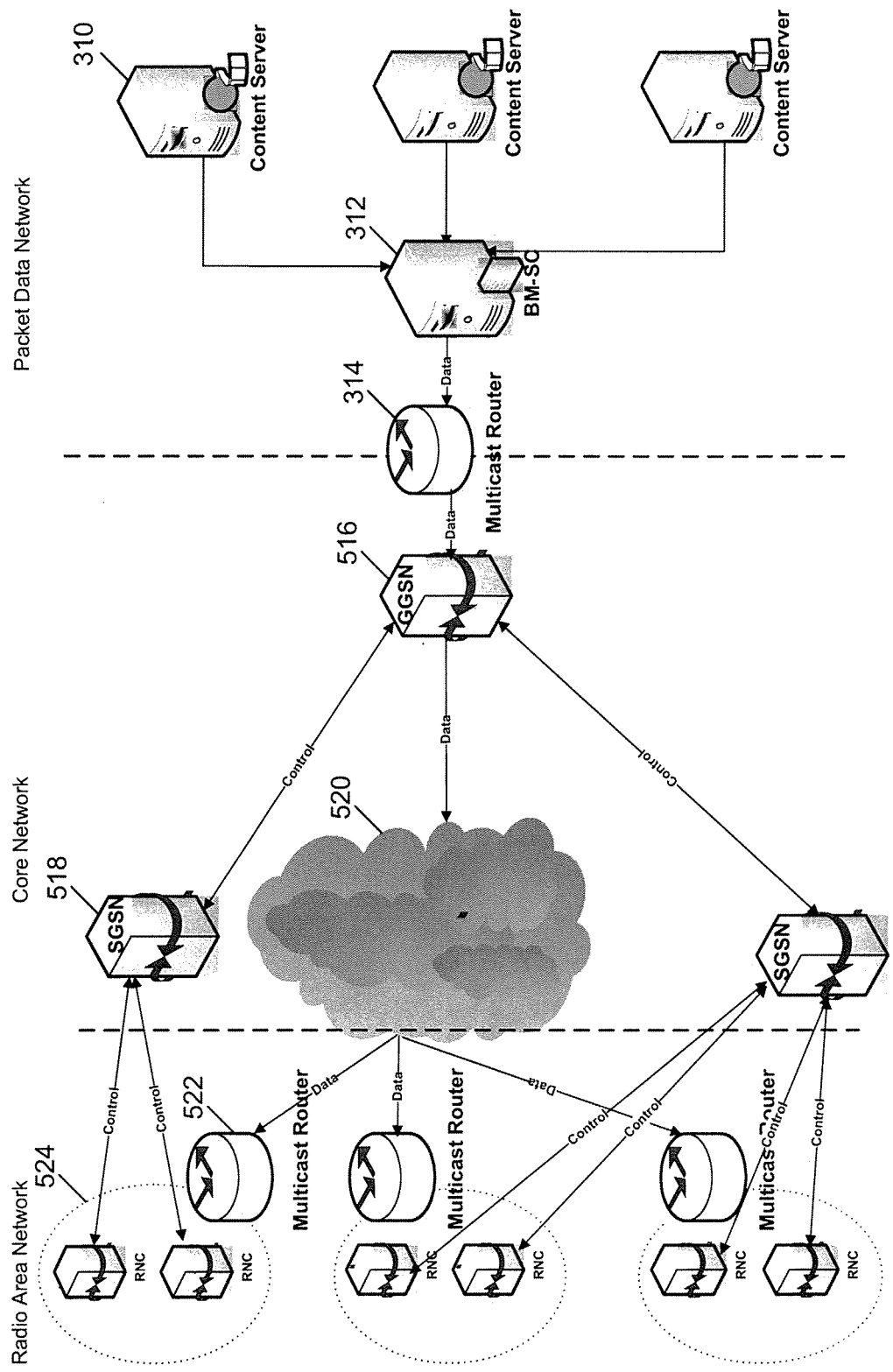
FIG. 5 illustrates a split unicast user plane and multicast data plane architecture in accordance with some embodiments.

Referring to FIG. 5, a third deployment is a direct multicast GTP-U architecture that includes a GGSN 516, SGSN 518, a network 520, a multicast router 522, and RAN 524 with RNCs. The SGSN 518 allots addresses for multicast transport and provides these multicast transport addresses to both RNCs in RAN 524 and GGSN 516. A special flag can be configured in the SGSNs to allot the same multicast transport address as the bearer data multicast address. This limits the number of copies per bearer stream to one at the GGSN, and reduces the possibility of duplicates of the bearer data (intended for another RNC) reaching an RNC across multiple multicast transport addresses. RNCs of RAN 524 can register via IGMP/MLD with an upstream multicast router. The purpose of registering is so the multicast router understands where to distribute bearer data because the multicast router is aware where the RNCs are in the network. GGSN 516 can forward GTP-U header encapsulated bearer data into the network and the bearer data can be forwarded to certain RNCs using multicast semantics.

Figures 6, 7:
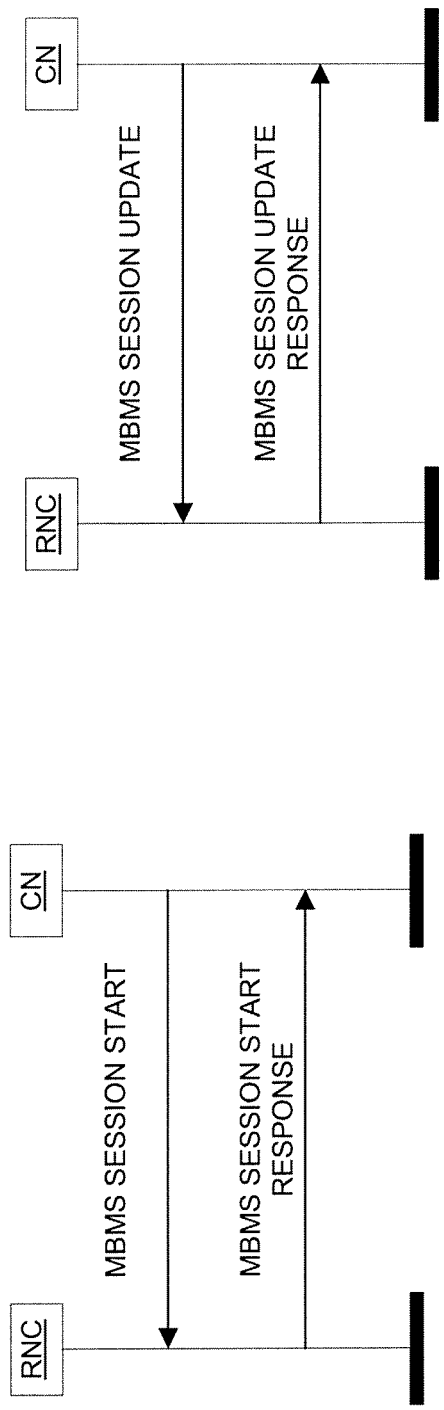
FIG. 6 illustrates a multicast user and data place architecture in accordance with some embodiments.
FIG. 7 illustrates a direct multicast architecture in accordance with some embodiments.

FIGS. 6 and 7 show signaling for a MBMS system in accordance with certain embodiments. The RNC receives a MBMS session start message from a core network node (CN), and sends a MBMS session start response message. This response message can be enhanced so that the SGSN can include a transport layer address IE so that the SGSN can specify the address on which the RNC is to listen. A second transport layer port IE can be employed to provide configured port information to the RNC. The transport layer address can also be allotted/changed during the MBMS session update signaling (FIG. 7). Similar IE fields can be included in the MBMS session update request. The RNCs can initiate an IPv4 IGMP "join" or IPv6 MLD "unsolicited report" to the upstream multicast router when the RNCs are ready to listen on the SGSN allotted multicast address. The RNCs can issue an IPv4 IGMP "leaves" or an IPv6 MLD "done" message to the upstream multicast router when the RNCs desire to terminate the receipt of the multicast bearer stream.

The SGSN and GGSN can be implemented in a gateway device which can perform multiple and different integrated functionalities. In some embodiments, an access gateway, a packet data serving node (PDSN), a foreign agent (FA), or home agent (HA) can be implemented on a network device. Other types of functionalities can also be implemented on a network device in other embodiments are a Gateway General packet radio service Service Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A network device can include a PDSN, a FA, a HA, a GGSN, a PDIF, an ASNGW, a UPE, an IP Gateway, an access gateway, or any other applicable access interface device. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. In certain embodiments, a gateway device is provided by Starent Networks, Corp. of Tewksbury, Mass. on an ST16 or ST40 multimedia platform.

The gateway device can include slots for loading application cards and line cards. A midplane can be used in the gateway device to provide intra-gateway communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the gateway device implemented by establishing inter-card communications between application cards and line cards. The control bus interconnects the control and management processors within the gateway device. The gateway device management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The gateway device supports at least two types of application cards: a switch processor card and a packet accelerator card. The switch processor card serves as a controller of the gateway device and is responsible for such things as initializing the gateway device and loading software configurations onto other cards in the gateway device. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the gateway device provide input/output connectivity and can also provide redundancy connections as well.

In some embodiments, a ST40 embodiment of the gateway device can support a system management card (SMC) and a packet services card (PSC). The system management card is a system control and management card for managing and controlling other cards in the gateway device. The packet services card is a high-speed processing card that provides mutli-threaded point-to-point, packet data processing, and context processing capabilities, among other things.

The operating system software can be based on a Linux software kernel and run specific applications in the gateway device such as monitoring tasks and providing protocol stacks. The software allows gateway resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, or IPSG).

The gateway device's software can be divided into a series of tasks that perform specific functions. These tasks communicate with each other as needed to share control and data information throughout the gateway device. A task is a software process that performs a specific function related to system control or session processing. Three types of tasks operate within the gateway device in some embodiments: critical tasks, controller tasks, and manager tasks. The critical tasks control functions that relate to the gateway's ability to process calls such as gateway initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a gateway device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the gateway device by monitoring the various software and hardware components of the gateway device. Recovery control task subsystem is responsible for executing a recovery action for failures that occur in the gateway device and receives recovery actions from the high availability task subsystem. Shared configuration task subsystem provides the gateway device with an ability to set, retrieve, and receive notification of gateway configuration parameter changes and is responsible for storing configuration data for the applications running within the gateway device. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the gateway, which include creating separate VPN contexts, starting IP services within a VPN context, managing IP pools and subscriber IP addresses, and distributing the IP flow information within a VPN context. In some embodiments, within the gateway device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a gateway device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Other embodiments are within the following claims. For example, while certain specific types of network nodes have been identified in the figures, others could be used for other standards.

What is claimed is:

1. A communication system for communicating multicast data from content sources to mobile users via radio area networks (RANs), the system comprising:
   an upstream multicast router for receiving multicast data from content sources and for routing the multicast data to a gateway support node;
   the gateway support node for receiving the multicast data from the content sources through the upstream multicast router;
   a serving support node in communication with the gateway support node and with a RAN;
   a downstream multicast router between the gateway support node and the RAN in communication with the RAN and with the serving support node, the downstream multicast router for:
      receiving multicast data from the gateway support node via a multicast network that performs addressing according to an IP multicast protocol, and
      routing the multicast data to the RAN; and
   the gateway support node for forwarding the multicast data to the downstream multicast router for distribution to multiple destinations.

2. The system of claim 1, further comprising a plurality of multicast routers, each associated with at least one RAN.

3. The system of claim 1, the multicast network being interposed between the serving support node and the downstream multicast router, and wherein the serving support node allots multicast transport addresses for multicast transport to the RAN.

4. The system of claim 1, further comprising the system being enabled to transmit multicast data from the gateway serving node to one or more of the downstream multicast router, one or more serving support nodes, an edge multicast network, and a further multicast router.

5. The system of claim 1, wherein the serving support node allots multicast transport addresses for multicast transport and provides these multicast transport addresses to radio network controllers in a radio access network and to a gateway serving node.

6. The system of claim 1, wherein the serving support node includes a serving GPRS support node (SGSN) and the gateway support node includes a gateway GPRS support node (GGSN).

7. The system of claim 6, wherein the GGSN and SGSN use unicast GTP-U for data.

8. The system of claim 6, wherein the SGSN allots addresses for multicast transport to the RAN.

9. The system of claim 6, further comprising a second multicast router for communicating data between the GGSN and a plurality of SGSNs.

10. The system of claim 9, wherein control data is provided between the GGSN and SGSNs without passing through the second multicast router.

11. A communication system for communicating multicast data from content sources to mobile users via radio area networks (RANs), the system comprising:
- an upstream multicast router for receiving multicast data and for routing the multicast data to a gateway support node;
- the gateway support node for receiving the multicast data from the upstream multicast router;
- a serving support node in communication with the gateway support node and with RANs;
- a downstream multicast router between the RANs and the gateway support node and in communication with the RANs and the gateway support node, the downstream multicast router for:
  - receiving multicast data from the gateway support node via a multicast network that performs addressing according to an IP multicast protocol, and
  - routing the multicast data to the RANs; and
- the gateway support node for forwarding the multicast data to the downstream multicast router for distribution to multiple destinations.

12. The system of claim 11, further comprising the serving support node configured to allot addresses for multicast transport and provide these multicast transport addresses to radio network controllers in a radio access network and to a gateway serving node.

13. The system of claim 11, further comprising the serving support node configured to use a bearer data multicast address and configured to maintain a flag to allot the same multicast addresses as the bearer data multicast address.

14. The system of claim 11, wherein the serving support node includes a serving GPRS support node (SGSN) and the gateway support node includes a gateway GPRS support node (GGSN).

15. The system of claim 11, further comprising a second multicast router for communicating data between the gateway support node and a plurality of RANs.

16. The system of claim 15, wherein control data is provided between the GGSN and SGSNs without passing through the second multicast router.

17. A method for communicating multicast data from content sources to mobile users via radio area networks (RANs), the method comprising:
- receiving multicast data from content sources at a gateway support node through an upstream multicast router, the upstream multicast router for receiving the multicast data from the content sources and for routing the multicast data to the gateway support node; and
- forwarding the multicast data from the gateway support node to a downstream multicast router via a multicast network that performs addressing according to an IP multicast protocol, for distribution to multiple destinations,
- the downstream multicast router between the RANs and the gateway support node in communication with one or more RANs and for
  - receiving multicast data from the gateway support node, and
  - routing the multicast data to the RANs.

18. The method of claim 17, wherein the multicast data is provided to the RANs through the serving support node.

19. The method of claim 17, wherein the multicast data is provided to the downstream multicast router and then through the RANs without passing through a serving support node.

20. The method of claim 17, wherein the serving support node allots addresses for multicast transport and provides these multicast transport addresses to radio network controllers in a radio access network and to a gateway serving node.

21. The method of claim 17, wherein the multicast data is provided to a plurality of downstream multicast routers and then to a plurality of RANs.

* * * * *